United States Patent [19]

Negi et al.

[11] Patent Number: 4,921,907

[45] Date of Patent: May 1, 1990

[54] RESIN COMPOSITION AND MULTILAYERED STRUCTURE

[75] Inventors: Taichi Negi, Kurashiki; Nobuo Tanaka, Nishinomiya; Kiyoshi Yonezu, Kurashiki, all of Japan

[73] Assignee: Kuraray Co., Ltd., Kurashiki, Japan

[21] Appl. No.: 139,871

[22] Filed: Dec. 30, 1987

[30] Foreign Application Priority Data

Dec. 30, 1986 [JP] Japan ................................ 61-310773

[51] Int. Cl.[5] ........................ C08L 29/02; C08L 29/04
[52] U.S. Cl. ........................................ 525/57; 525/60; 525/61
[58] Field of Search ............................. 525/57, 61, 60

[56] References Cited

U.S. PATENT DOCUMENTS

| | | | |
|---|---|---|---|
| 4,576,988 | 3/1986 | Tanaka et al. | 525/60 |
| 4,608,286 | 8/1986 | Motoishi et al. | 428/35 |
| 4,613,644 | 9/1986 | Moritani et al. | 524/430 |
| 4,619,849 | 10/1986 | Anzawa et al. | 428/35 |
| 4,636,551 | 1/1987 | Okaya et al. | 525/60 |
| 4,640,870 | 2/1987 | Akazawa et al. | 428/35 |
| 4,645,695 | 2/1987 | Negi et al. | 428/35 |
| 4,684,564 | 8/1987 | Satoh et al. | 428/216 |
| 4,713,296 | 12/1987 | Aoyama et al. | 525/61 |
| 4,774,114 | 9/1988 | Moritani et al. | 525/57 |

Primary Examiner—Allan M. Lieberman
Attorney, Agent, or Firm—Kramer, Brufsky & Cifelli

[57] ABSTRACT

A resin composition comprising from about 95 to about 30 parts by weight of a saponified product of an ethylene-vinyl acetate copolymer (A), comprising ethylene units in an amount of from about 20 to about 55 mole percent, and exhibiting a degree of saponification of the vinyl acetate component of at least about 90 mole percent, and from about 5 to about 70 parts by weight of a saponified product of a modified ethylene-vinyl acetate copolymer (B) comprising pyrrolidone ring-containing units in an amount of from about 0.1 to about 10 mole percent, and ethylene units in an amount of from about 20 to about 55 mole percent, and exhibiting a degree of saponification of the vinyl acetate component of at least about 90 mole percent, and a multilayered structure made therewith, preferably formed by high speed thermodrawing, exhibiting uniform gas barrier properties and producing a product without pinholes, cracks, and localized areas of uneven stretching.

12 Claims, No Drawings

RESIN COMPOSITION AND MULTILAYERED STRUCTURE

BACKGROUND OF THE INVENTION

1. Field of the Invention

The present invention relates to saponified products of ethylene-vinyl acetate copolymer (referred to as EVOH hereinafter) compositions, which are superior in thermodrawability and in gas barrier properties, and which do not exhibit pinholes, cracks, localized areas of uneven stretching and the like, upon thermodrawing, and multilayered structures utilizing the same, especially thermodrawn, more particularly high speed thermodrawn multilayered structures.

2. Description of the Prior Art

EVOH resin is well known for its effectiveness as a food packaging film, especially for food requiring oxygen barrier packagings and other articles wherein the fragrance of the article must be retained. An EVOH single layer film is not tough enough and has insufficient barrier properties to moisture and water.

In order to overcome the foregoing disadvantages, EVOH is often used in combination with thermoplastic resins, such as, polypropylene, polystyrene and the like; and heat sealing layers, such as, ionomers, ethylene-vinyl acetate copolymers and the like; in the form of multilayered laminate structures.

In fabricated products, such as containers, formed from multilayered structures produced by various methods (films, sheets, parisons and the like), especially those drawn and formed below the melting point of EVOH, the EVOH layer exhibits many small voids, cracks, and localized areas of uneven stretching, such that the oxygen barrier properties of the formed containers are greatly reduced. Consequently, the formed containers cannot be used as packagings for food because of their poor appearance.

Several methods have been proposed for preventing pinholes, cracks and the like during the thermodrawing of multilayered structures containing EVOH. Japanese Patent Laid-open Nos. 88,067/1978 and 20345/1984 disclose the addition of various plasticizers to EVOH, and Japanese Patent Laid-open Nos. 141,785/1977, 154,755/1983 and 36,412/1983, teach blending of the EVOH resin with a polyamide resin. None of these methods have satisfactorily resolved these problems. Specifically, the method employing the addition of plasticizers containing hydroxyl groups, aromatic sulfonamides and the like, cannot be put to practical use because the addition of the plasticizers in the desired range of 10 to 20 weight percent with respect to the EVOH greatly reduces the gas barrier properties, and also decreases the adhesive strength between the EVOH layer and other plastic resin layers, presumably due to bleeding of the plasticizer.

Methods which comprise blending polyamide resins with EVOH in order to impart flexibility thereto and improve the fabricability are well known and many patent applications have been filed. (Japanese Patent Publication Nos. 24,277/1969, 24,813/1985, and 38,897/1984, Japanese Patent Laid-open Nos. 129,035/1983 and 36,412/1983.) However, a blend of polyamides capable of improving high speed thermodrawability cannot be put to practical use because a substantial amount of gels result in the formed articles presumably due to the high reactivity of the polyamides with the EVOH and substantial tinting (discoloring) results. Blends of polyamide with EVOH exhibiting less tinting (discoloration) are also known and produce esthetically pleasing formed articles without any apparent cracks, pinholes and localized areas of uneven stretching at low speed thermodrawing, but exhibit a large variability of observed values of gas barrier properties presumably due to minute pinholes, presumably because of the low compatibility of polyamides with EVOH. Furthermore, the recent speedup of thermodrawing machines causes increased scatter in the observed values for the gas barrier properties and results in decreased reliability as a gas barrier container.

The recent requirement for prolonged preservation of packaged food demands packaging exhibiting increased gas barrier properties. Thickening of the EVOH layer to meet these requirements tends to produce very small pinholes, cracks, localized areas of uneven stretching and the like as compared with the use of a relatively thin EVOH layer in thermodrawing. The thickening of the EVOH layer also results in increased variability in observed values for the gas barrier properties, which results in decreased reliability as a gas barrier container.

There is a tendency to blend scraps, such as trimmings from the formation process, containers and the like, with the thermoelastic resins in order to decrease product costs. In this case, the thermoplastic resin layer blended with the recovery plastic resins tends to exhibit localized areas of uneven stretching, cracks and the like, and becomes poor in appearance.

An object of the present invention is to produce an EVOH composition exhibiting excellent forming characteristics, superior gas barrier properties and high reliability as a gas barrier container (with less variability in observed values for the gas barrier properties) without pinholes, cracks, localized areas of uneven stretching and the like, at high speed thermodrawing.

SUMMARY OF THE INVENTION

EVOH resin alone exhibits many superior characteristics as mentioned hereinbefore, but also has some disadvantages which produce cracks, very small pinholes, localized areas of uneven stretching and the like, during the processing of the laminated structure with a thermoplastic resin into a container, which results in decreased gas barrier properties. In this case, the appearance is also poor and the product cannot be used as a food packaging container.

The EVOH composition of the present invention retains the excellent gas barrier properties of EVOH, while also being capable of processing into a high barrier container of multilayered structure without producing cracks, pinholes, localized areas of uneven stretching and the like.

It is an object of the present invention to provide a resin composition comprising from about 95 to about 30, preferably from about 95 to about 55, weight percent of a saponified product of an ethylene-vinyl acetate copolymer (referred to as EVOH(A) hereinafter) containing ethylene units in an amount of from about 20 to about 55 mole percent, exhibiting a degree of saponification of the vinyl acetate component of at least about 90 mole percent; and from about 5 to about 70, preferably from about 5 to about 45, weight percent of a saponified product of a modified ethylene-vinyl acetate copolymer (referred to as EVOH(B) hereinafter) comprising pyrrolidone ring containing units in an amount of from about 0.1 to about 10 mole percent, ethylene units in an amount of from about 20 to about 55 mole percent and exhibiting a degree of saponification of the vinyl acetate component of at least about 90 mole percent.

It is a further object of the present invention to provide a multilayered structure comprising a layer of the foregoing resin composition with a thermoplastic resin layer on at least one side thereof, preferably a thermodrawn multilayered structure and more preferably, a high speed thermodrawn multilayered structure.

DETAILED DESCRIPTION OF THE INVENTION

The EVOH(A) and the EVOH(B) used in the present invention contain ethylene units in an amount of from about 20 to about 55 mole percent, preferably from about 25 to about 50 mole percent, and exhibiting a degree of saponification of at least about 90 mole percent, preferably at least about 96 mole percent. With less than about 20 mole percent ethylene units, the formation of the resin becomes difficult, because the formation temperature approaches the decomposition temperature. With more than about 55 mole percent ethylene units, the gas barrier properties of the formed articles decrease and the container made from the multilayered structure exhibits inferior gas barrier properties. With a saponification degree of less than about 96 mole percent, especially less than about 90 mole percent, the EVOH resin can be formed into containers but, it contains some cracks, pinholes and the like, and more importantly, exhibits inferior gas barrier properties.

Furthermore, EVOH(A) and EVOH(B) exhibit a melt index (observed by the method of ASTM-D 1238-65T, at 190° C. under a load of 2160 g) of from about 0.1 to about 25 g/10 minutes, preferably from about 0.3 to about 20 g/10 minutes.

The EVOH(B) comprises pyrrolidone ring-containing units in an amount of from about 0.1 to about 10 mole percent, preferably from about 0.1 to about 5 mole percent. Less than about 0.1 mole percent pyrrolidone ring-containing units does not provide aesthetic formed articles free of cracks and localized areas of uneven stretching on account of its inadequate drawability when blended with EVOH(A). More than about 10 mole percent of pyrrolidone ring-containing units, results in products exhibiting poor thermal stability and which are susceptible to gelation at the point of melt formation. In addition, the product exhibits inadequate water resistance and moisture resistance, which result in poor gas barrier properties in a high humidity atmosphere. A preferred pyrrolidone ring-containing monomer is N-vinyl-2-pyrrolidone or a derivative thereof, the former being most preferable. EVOH(B) is obtained by the saponification of a copolymer comprising ethylene, vinyl acetate and a pyrrolidone ring-containing monomer.

The ratio of the mixture of EVOH(A) and EVOH(B) (referred to as the ratio (A/B) hereinafter) ranges from about 95/5 to about 30/70, preferably from about 95/5 to about 55/45. More than the ratio (A/B) of about 95/5 tends to produce cracks, pinholes, and localized areas of uneven stretching during the formation of the container and results in a wide variability in the gas barrier property data. Less than the ratio (A/B) of about 30/70 results in a product which is uneven in film thickness, which is especially prominent in the coextruded film.

In the present invention, the EVOH(A) and the EVOH(B) exhibit ethylene units with more than about a 5 mole percent difference and preferably satisfy the following equations:

$$E'(B) \leq 10^9 \text{ dyne/cm}^2 \qquad (I)$$

$$1.0 \leq E'(A)/E'(B) \qquad (II)$$

$$|SP(A) - SP(B)| \geq 0.1 \qquad (III)$$

$$0.05 \leq MI(A)/MI(B) \leq 20 \qquad (IV)$$

wherein:
- E'(A) is the dynamic viscoelasticity of EVOH(A) in dyne/cm² at the thermodrawing formation temperature;
- E'(B) is the dynamic viscoelasticity of EVOH(B) in dyne/cm² at the thermodrawing formation temperature;
- SP(A) is the solubility parameter of EVOH(A) (by Small method),
- SP(B) is the solubility parameter of EVOH(B) (by Small method).

When there is less than about a 5 mole percent difference between the EVOH(A) and EVOH(B) ethylene units, and the melt index ratio of EVOH(A) to EVOH(B) MI(A)/MI(B) is more than about 20 or less than about 0.05 or the solubility parameter difference of EVOH(A) and EVOH(B) |SP(A)−SP(B)| is less than about 0.1, the resin tends to produce cracks and pinholes during the formation of container, and results in a wide variability in the gas barrier property values, presumably because of uneven dispersion in the blending of the EVOH(A) and the EVOH(B). When the dynamic viscoelasticity of the EVOH(B) at the thermodrawing formation temperature E'(B) is more than about 10⁹ dyne/cm², or when the ratio of the dynamic viscoelasticity of EVOH(A) to EVOH(B) at the thermodrawing formation temperature E'(A)/E(B) is less than about 1.0, drawing tends to become uneven during the container formation.

The process of blending EVOH(A) with EVOH(B) is not critical but preferred methods include dry blending of the EVOH(A) with the EVOH(B), pelletizing and drying employing a bunbury mixer, single-screw or twin-screw extruder, and the like. The generation and mixing of gels and hard spots during the blending operation is liable to cause breaks and/or unevenness of the blended EVOH layer during the thermodrawing formation, so that the use of a high-power extruder for heating and blending, nitrogen gas seal of the hopper opening of the extruder, and a relatively lower temperature for extruding is generally recommended.

Additives such as resins, anti-oxidants, plasticizers, and colorants may be added in a range such that the advantages of the present invention are not affected. Preferably, heat stabilizers such as hydrotalcites, hindered phenols, hindered amines and the like, are added in the range of from about 0.01 to about 1 weight percent.

Although the EVOH composition of the present invention can be formed into a film, sheet, tube, bottle and the like, by well known melt forming and compression forming techniques, the EVOH composition can exhibit its features most effectively when used as a single layer of the multilayered structure.

The thermoplastic resins to be used in the multilayered structure of the present invention are those which can be formed under drawing in the following temperature range:

$$X - 10 \geq Y \geq X - 110$$

wherein X(°C.) is the melting point of the EVOH(A), and Y(°C.) is the thermodrawing temperature of thermoplastic resin.

When Y is higher than (X−10)°C., the EVOH can be formed without any particular additives because the EVOH softens and melts at a temperature in this range. On the other hand, when Y is lower than (X−110)°C., the glass transition temperature (Tg) of the thermoplastic resin being under room temperature, the formed articles produced are of little practical value because of the shape and dimensional instability of the article at room temperature.

These thermoplastic resins include polypropylene, saturated polyester, polystyrene, polyamide and polyvinyl chloride. Preferable among them are polypropylene (homo polypropylene, ethylene-propylene block copolymer, ethylene-propylene random copolymer and the like), polystyrene (homo styrene, high impact resistant grade polystyrene and the like) and saturated polyester.

The process of producing the multilayered structure of the present invention comprises making a laminate of the foregoing EVOH composition and the foregoing thermoplastic resin employing an adhesive resin in an extrusion lamination, dry lamination, coextrusion lamination, coextrusion sheet formation (feed block or multiple manifold method), coextrusion pipe formation, coinjection, solutions coating method, and the like. The multilayered structure is then stretched below the melting point of the thermoplastic resin using a vacuum air-pressure deep draw former, biaxial stretch blow molder, or the like, (SPPF formation), thermodrawing the laminate (sheet or film) with a biaxial stretcher, and coinjection biaxial stretching of the EVOH composition with the thermoplastic resin, and the like.

As for the thickness of multilayered structure, the tensile force ratio of the EVOH layer to thermoplastic resin layer can be about 5 or less, preferably about 1 or less. When the tensile force ratio of the EVOH layer to the thermoplastic resin layer is more than about 5, the EVOH composition is liable to produce unfavorable cracks and localized areas of uneven stretching. The tensile force of the thermoplastic resin layer in the multilayered structure herein described is observed at 50 mm per minute of tensile rate, being 50 mm of chuck distance, at 100% elongation, at the thermodraw formation temperature. The tensile force of the EVOH is that of the EVOH(A), EVOH(B) blended layer observed as described above. These tensile forces can be observed as described above on a sample where relaxed the draw to the state of before drawing by hot pressing of a drawn multilayered structure.

The laminate can have the following structure: thermoplastic resin layer/EVOH composition layer/thermoplastic resin layer; EVOH composition layer/adhesive resin layer/ thermoplastic resin layer; theremoplastic resin layer/adhesive resin layer/EVOH composition layer/adhesive resin layer/thermoplastic resin layer, and the like. When using a thermoplastic resin layer on both outer sides, they may be the same or different resins.

The adhesive resin as used herein refers to any resin which is capable of drawing, is formable at temperatures lower than the melting point of EVOH and can adhere the EVOH composition layer to the thermoplastic resin layer. Preferred adhesive resins include polyolefins (e.g., polyethylene, polypropylene), ethylenevinyl acetate copolymers, ethylene acrylic acid ester (e.g., methyl ester, ethyl ester) copolymers, and the like, having added or grafted thereto ethylenically unsaturated carboxylic acids or anhydrides thereof (e.g., maleic anhydride).

The thermodrawn multilayered structures herein described are the articles prepared by thermodrawing, such as containers, i.e., cups, bottles and the like, and sheet film type goods. Heating herein described means a method to heat the multilayered structure uniformly by keeping it at a satisfactory temperature for thermodrawing for a specified period of time. Uniform heating can be carried out preferably by various heaters at the point of operation. Heating may be carried out during or before drawing. Drawing herein described means an operation to form a uniformly heated multilayered structure into a container, cup, sheet or film by chucks, plugs, vacuum air-pressure, blow molding, or the like. A uniaxial or biaxial drawing (simultaneously or successive) can be employed. The draw ratio and the draw rate employed in the present invention can be selected appropriately for the purpose. The high speed drawing described in the present invention means the uniform formation of containers or film at a speed of more than about $5 \times 10^5$ percent (draw area magnification) per minute and does not require that the formed article be oriented.

The draw ratio based on area should be about 70 times or less, preferably about 3 to about 60 times. When the draw ratio is more than about 70 times, the thermoplastic resin cannot be stretched uniformly, and the multilayered structure becomes poor.

The moisture content of the EVOH composition layer when thermodrawing is not particularly limited, but preferably is in the range of from about 0.01 to about 10 percent.

The recovery of the trimming and scraps of defective containers and the like is not particularly limited. The scraps may be recovered by pulverizing, drying when moistened, and dry blending with the raw material thermoplastic resin; pelletizing and dry blending with the raw material thermoplastic resin; pulverizing, dry blending with the thermoplastic resin, and pelletizing; and the like. As the blend ratio of the scrap to the raw material thermoplastic resin is increased, localized areas of uneven stretching, nonuniformity, cracks, haze and the like are liable to occur. Generally, a blend ratio in the range of about 2 to 100 percent is acceptable.

Plural additives such as maleic anhydride modified polyolefins, metal soap, hydrotalcite and the like are preferably added to improve the dispersibility and thermal stability, and to prevent unfavorable phenomena during the formation of the container. The thus obtained high speed thermodrawn multilayered structure, exhibiting excellent gas barrier properties and free from pinholes, cracks and localized areas of uneven stretching, is suitable for use as a uniform high quality packaging container for foods and a container which retains fragrances and the like.

The invention is now described in detail with reference to the following examples, which are not intended to limit the scope of the invention.

EXAMPLES

Example 1

EVOH(A) ("EP-E101"), a product of Kuraray Co., Ltd.) containing ethylene units in an amount of 32 mole percent, exhibiting a degree of saponification of 99.6 mole percent, and a melt index (MI(A)) of 1.6 g/10 minutes at 190° C. was found to have a solubility parameter (SP(A)) of 10.6 and a dynamic viscoelasticity E'(A) of $7 \times 10^9$ dyne/cm$^2$ (at 130° C., 110 Hz) observed using a Vibron (manufactured by Toyo Baldwin Co., Ltd.).

EVOH(B) containing N-vinyl-2-pyrrolidone units in an amount of 2 mole percent and ethylene units in an amount of 44 mole percent, exhibiting a degree of saponification of 99.6 mole percent and exhibiting a melt index (MI(B) at 190° C.) of 5.5 g/10 minutes was found to have a solubility parameter SP(B) of 9.8 and a dynamic viscoelasticity E'(B) of $6 \times 10^8$ dyne/cm$^2$ (at 130° C.). From the foregoing data, the difference between SP(A) and SP(B) is 0.8, and the ratio of E'(A) to E'(B) (E'(A)/E'(B)) is 13.

The blend of EVOH(A) and EVOH(B) containing 80 parts by weight of EVOH(A) and 20 parts by weight of EVOH(B) was pelletized using a twin-screw type vented 40 mm $\phi$ extruder wherein the hopper opening was sealed with nitrogen gas at 200° C. The pellets thereby obtained were dried at 80° C. for 8 hours. The pellets were then fed to a feed block type coextruder forming 5 layers with 3 extrudates. The sheet thereby obtained was constructed of 800 $\mu$ outer layers made of polystyrene (PS) ("Idemitsu Styrol ET-61", a product of Idemitsu Petrochemical Co., Ltd.), 50 $\mu$ adhesive layers made of maleic anhydride-modified ethylene-vinyl acetate copolymer ("Merthene M-5420", a product of Toyo Soda Mfg. Co., Ltd.), and a 50 $\mu$ inter layer made of the above-mentioned EVOH. The tensile force of the polystyrene (PS) layer of this sheet was 1.0 kg/15 mm width at 100% elongation at 130° C., and that of the EVOH layer (50 $\mu$) was 0.3 kg/15 mm width under the same conditions, and the tensile force ratio of the EVOH layer to the PS layer, EVOH/PS, was 0.3. This sheet was thermoformed by thermodrawing at 130° C. using a vacuum air-pressure former (at a draw rate of $9 \times 10^5$ percent/minute, draw ratio of 1, and stretch ratio of 7). The thus obtained formed articles were excellent in clarity and appearance and did not exhibit cracks and localized areas of uneven stretching. The gas barrier properties of these containers at 20° C., 65% RH (measured by 10/50 type of Mocon Co., Ltd.) was excellent, i.e., 0.7 cc .20 $\mu$/m$^2$.24 hr. atm., which means the oxygen permeated amount (cc)/m$^2$ hr. atm. in terms of a 20 $\mu$ thick layer of a blend of EVOH(A) and EVOH(B), and R (maximum value−minimum value, when n=20) was 0.2.

Comparative Example 1

In Comparative Example 1, the formed article was produced in the same manner as Example 1 except an EVOH(B) containing ethylene units in an amount of 44 mole percent and exhibiting a degree of saponification of 99.4 mole percent was used. The thus obtained formed containers cannot be put to practical use because the containers exhibit many localized areas of uneven stretching.

Example 2

A blend of EVOH(A) and EVOH(B) was prepared in the same manner as Example 1 and formed into a bottle of 3 layers with 2 extrudates, constructed of polyester ($[\eta]=0.7$)/a blend of EVOH(A) and EVOH(B)/polyester ($[\eta]=0.7$) using a coinjection costretch blow former manufactured by Nissei ASB Machine Co., Ltd. The dynamic viscoelasticity of EVOH(A), E'(A), at 100° C. was $9 \times 10^9$ dyne/cm$^2$, and that of EVOH(B), E'(B), at 100° C. was $9 \times 10^8$ dyne/cm$^2$. The tensile force of the polyester layer of the parison before thermodrawing at 100° C. was 3 kg/15 mm width, and that of the EVOH layer was 0.4 kg/15 mm width. The ratio of tensile force of the EVOH layer to the polyester layer was 0.13. The gas barrier properties of the thus obtained bottle were excellent, i.e., 0.5 cc .20 $\mu$/m$^2$ .24 hr. atm. and R=0.1 without longitudinal strips of localized uneven thickness, uneven stretching, cracks and the like.

Comparative Example 2

In Comparative Example 2, the formed bottle was produced in the same manner as Example 2 using EVOH(A) alone instead of the blend of EVOH(A) and EVOH(B). The thus obtained bottle cannot be put to practical use because the container exhibits many longitudinal strips of uneven thickness and localized areas of uneven stretching.

Example 3

EVOH(A) containing ethylene units in an amount of 32 mole percent, exhibiting a degree of saponification of 99.6% and a melt index (MI(A)) of 1.5 g/10 minutes at 190° C. was found to exhibit a solubility parameter (SP(A)) of 10.6 and a dynamic viscoelasticity E'(A) of $3 \times 10^9$ dyne/cm$^2$ at 150° C.

EVOH(B) containing N-vinyl-2-pyrrolidone units in an amount of 1 mole percent and ethylene units in an amount of 40%, exhibiting a degree of saponification of 99.6 mole percent and exhibiting a melt index (MI(B)) at 190° C. of 5.0 g/10 minutes was found to exhibit a solubility parameter SP(B) of 10.0 and a dynamic viscoelasticity E'(B) of $1 \times 10^8$ dyne/cm$^2$ at 150° C. From the foregoing date, the difference between SP(A) and SP(B) was calculated to be 0.6, and the ratio of E'(A) to E'(B) (E'(A)/E'(B)) was 30.

A blend of EVOH(A) and EVOH(B) containing 10 parts by weight of EVOH(A) and 80 parts by weight of EVOH(B) was pelletized and formed into a sheet in the same manner as Example 1. The thus obtained sheet was constructed of a 800 $\mu$ outer layers of polypropylene ("Mitsubishi Noblen MA6", a product of Mitsubishi Petrochemical Co., Ltd.), a 50 $\mu$ adhesive layer of maleic anhydride modified ethylene-vinyl acetate copolymer ("Admer QF500", a product of Mitsui Petrochemical Co., Ltd.), and a 50 $\mu$ inter layer of the above mentioned EVOH.

The tensile force of the polypropylene in this sheet was 1.6 kg/15 mm width at 150° C. Therefore, the tensile force ratio of the EVOH layer to the polypropylene layer, EVOH layer/polypropylene, layer was 0.13.

A sheet was thermoformed by thermodrawing at 150° C. using a vacuum air-pressure former (at a draw rate of $9 \times 10^5$ percent/minute, a draw ratio of 1, and a stretch ratio of 7 times). The thus obtained formed articles were excellent in clarity and appearance and did not exhibit cracks and localized areas of uneven stretching.

The gas barrier properties of this container at 20° C., 65% RH was excellent, i.e., 0.6 cc. 20 $\mu$/m$^2$ .24 hr. atm. and R (when n=20) was 0.2.

Example 4

The formed article was produced in the same manner as Example 3, except an EVOH(A) containing ethylene units in an amount of 36 mole percent, exhibiting a degree of saponification of 99.6 mole percent and a melt index (MI, at 190° C.) of 1.5 g/10 minutes was used. The EVOH(A) used in this Example was found to exhibit a solubility parameter of 10.3, and a dynamic viscoelasticity of $2 \times 10^{10}$ dyne/cm$^2$.

The thus obtained container can be put to practical use as it exhibits only a little nonuniformity.

Example 5

The trimmings and scraps from the multilayered structure generated during the forming of the container of Example 3 were pulverized and pelletized. The thus obtained pellets were blended with polypropylene resin (MA6) in an amount of 30 weight percent, and the thus obtained resin was formed in the same manner as Example 3. The formed article is an excellent container which does not exhibit cracks, nonuniformity, even though the recovered substances, such as trimmings, scraps and the like were blended in the polypropylene layer. The tensile force ratio of the EVOH layer to the polypropylene layer, EVOH layer/polypropylene layer, was 0.15. The gas barrier properties of this container were excellent, i.e., 0.7 cc. 20 $\mu$/m$^2$ .24 hr. atm. of oxygen permeability and R was 0.1.

What is claimed is:

1. A resin composition comprising from about 95 to about 30 parts by weight of a saponified product of an ethylene-vinyl acetate copolymer (A), comprising ethylene units in an amount of from about 20 to about 55 mole percent, and exhibiting a degree of saponification of the vinyl acetate component of at least 90 mole percent, and from about 5 to about 70 parts be weight of a saponified product of a modified ethylene-vinyl acetate copolymer (B) comprising pyrrolidone-ring containing units in an amount of from about 0.1 to about 10 mole percent, and ethylene units in an amount of from about 20 to about 55 mole percent, and exhibiting a degree of saponification of the vinyl acetate component of at least 90 mole percent, wherein the difference between the amount of ethylene units of copolymer (A) and copolymer (B) is at least about 4 mole percent.

2. A resin composition according to claim 1, wherein the ethylene content of copolymers (A) and (B) ranges from about 25 to about 50 mole percent.

3. A resin composition according to claim 1 comprising from about 95 to about 55 parts by weight of said saponified product of an ethylene-vinyl acetate copolymer (A) and from about 5 to about 45 parts by weight of said saponified product of a modified ethylene-vinyl acetate copolymer (B).

4. A resin composition according to claim 1, wherein the degree of saponification of copolymer (A) is at least about 96 mole percent.

5. A resin composition according to claim 1, wherein the degree of saponification of copolymer (B) is at least about 96 mole percent.

6. A resin composition according to claim 1, wherein copolymer (B) comprises from about 0.1 to about 5 mole percent pyrrolidone ring-containing units.

7. A resin composition according to claim 1, wherein the pyrrolidone ring-containing unit is N-vinyl-2-pyrrolidone.

8. A resin composition according to claim 1 further comprising an anti-oxidant.

9. A resin composition according to claim 1 further comprising a plasticizer.

10. A resin composition according to claim 1 further comprising a colorant.

11. A resin composition according to claim 1, wherein the difference between the amount of ethylene units of copolymer (A) and copolymer (B) is at least about 5 mole percent.

12. A resin composition according to claim 1 wherein the dynamic viscoelasticity of copolymer (B) at the thermodrawing formation temperature is less than or equal to 10$^9$ dynes/cm$^2$, the ratio of the dynamic viscoelasticity at the thermodrawing formation temperature of copolymer (A) to copolymer (B) is greater than or equal to about 1.0, the difference in solubility parameter, as measured by the Small method, between copolymer (A) and copolymer (B) is greater than or equal to about 0.1 and the melt index ratio of copolymer (A) to copolymer (B) is greater than or equal to about 0.05 and less than or equal to about 20.0

* * * * *